(12) United States Patent
Ehrman et al.

(10) Patent No.: US 8,109,285 B2
(45) Date of Patent: Feb. 7, 2012

(54) ROLL OVER VENT VALVE

(75) Inventors: Moshe Ehrman, Halutza (IL); Omer Vulkan, Halutza (IL); Ilan Akian, Halutza (IL)

(73) Assignee: Raval A.C.S. Ltd., Beer-Sheva (IL)

( * ) Notice: Subject to any disclaimer, the term of this patent is extended or adjusted under 35 U.S.C. 154(b) by 0 days.

(21) Appl. No.: 11/523,012

(22) Filed: Sep. 19, 2006

(65) Prior Publication Data

US 2007/0102043 A1  May 10, 2007

(30) Foreign Application Priority Data

Nov. 8, 2005  (IL) .......................................... 171822

(51) Int. Cl.
F16K 24/04 (2006.01)
F16K 17/26 (2006.01)
F16K 15/14 (2006.01)
B60K 15/035 (2006.01)

(52) U.S. Cl. ........ 137/202; 137/493.8; 137/43; 137/843

(58) Field of Classification Search ............ 137/39, 137/43, 202, 493.8, 854, 843
See application file for complete search history.

(56) References Cited

U.S. PATENT DOCUMENTS

| | | | |
|---|---|---|---|
| 3,776,256 A * | 12/1973 | Marshall | 137/202 |
| 3,799,427 A * | 3/1974 | Goglio | 383/103 |
| 3,889,710 A * | 6/1975 | Brost | 137/512.15 |
| 4,953,583 A | 9/1990 | Szlaga | |
| 5,313,977 A | 5/1994 | Bergsma et al. | |
| 5,566,705 A | 10/1996 | Harris | |
| 5,623,969 A * | 4/1997 | Raines | 137/854 |

(Continued)

FOREIGN PATENT DOCUMENTS

DE  37 38 086  5/1988

(Continued)

OTHER PUBLICATIONS

Office Action, issued Nov. 17, 2009, in a counterpart Japanese Application (No. 2006-261213), with English language translation from Japanese; 15 pages total.

(Continued)

*Primary Examiner* — Stephen M Hepperle
*Assistant Examiner* — Atif H Chaudry
(74) *Attorney, Agent, or Firm* — The Nath Law Group; Susanne M. Hopkins; William L. Klima

(57) ABSTRACT

A roll-over vent valve comprising a housing formed with a fluid inlet and a fluid outlet, a valve seating bounding an outlet aperture of the housing, a float member received within the housing and axially displaceable between a sealed position wherein a sealing member thereof sealingly bears against the valve seating of the outlet aperture to seal the fluid outlet, and an open position wherein the sealing member is disengaged from the valve seating whereby the fluid outlet is in flow communication with the fluid inlet. There is further provided a pressure-retention device extending intermediate the valve seating and the fluid outlet, to thereby shut fluid flow therebetween as long as pressure differential between the fluid inlet and the fluid outlet does not exceed a minimal pressure threshold. The valve further comprises a one-way fluid inlet valve being in flow communication with said fluid outlet to allow fluid flow towards said fluid inlet a substantially high flow rate at the event of under-pressure at the fluid inlet.

15 Claims, 4 Drawing Sheets

U.S. PATENT DOCUMENTS

| | | | |
|---|---|---|---|
| 5,738,132 A | 4/1998 | Zakai et al. | |
| 5,749,347 A * | 5/1998 | Torii et al. | 123/516 |
| 5,927,315 A | 7/1999 | Kim | |
| 6,062,250 A * | 5/2000 | Takahashi | 137/202 |
| 6,145,539 A * | 11/2000 | Wilcox et al. | 137/614.03 |
| 6,206,057 B1 | 3/2001 | Benjey et al. | |
| 6,561,211 B2 * | 5/2003 | Devall | 137/202 |
| 2003/0066558 A1 | 4/2003 | Muto et al. | |
| 2004/0159349 A1* | 8/2004 | Keefer et al. | 137/72 |

FOREIGN PATENT DOCUMENTS

| | | |
|---|---|---|
| DE | 199 22 453 | 1/2000 |
| EP | 0 568 005 | 3/1993 |
| JP | 46-41799 | 12/1971 |
| JP | 47-36224 | 11/1972 |
| JP | 58-42277 U | 3/1983 |
| JP | 59-165346 U | 11/1984 |
| JP | 2-50575 U | 4/1990 |
| JP | 3-117857 U | 12/1991 |
| JP | 6-147045 A | 5/1994 |
| JP | 11-13910 A | 1/1999 |
| JP | 11-247730 A | 9/1999 |
| JP | 2003-26266 A | 1/2003 |
| JP | 2003-113953 A | 4/2003 |

OTHER PUBLICATIONS

Office Action, issued Apr. 13, 2010, in a counterpart Japanese Application (No. 2006-261213), with English language translation from Japanese; 6 pages total.

Office Action, issued Dec. 28, 2010, in a counterpart Japanese Application (No. 2006-261213; Appeal Request No. 2010-18313), with English language translation from Japanese; 15 pages total.

* cited by examiner

ROLL OVER VENT VALVE

FIELD OF THE INVENTION

The present invention relates to a roll over vent valve designed to allow, on the one hand, for the venting of fuel vapor from a vehicle fuel tank to the atmosphere or rather to a vapor recovery system such as a carbon canister, and, on the other hand, to ensure the closure of the valve under certain conditions. These conditions can arise either when, as a result of excessive filling of the tank, fuel passes into the valve or, and most significantly, when as a result of a sudden change of position of the tank, such as, for example, when the vehicle and the tank roll over, fuel could escape from the tank through the otherwise opened valve. However, the valve of the present invention also permits airing the fuel tank at a substantially high flow-rate.

BACKGROUND OF THE INVENTION

A variety of roll over vent valves are well known, examples thereof being described inter alia in U.S. Pat. Nos. 5,313,977 and 5,738,132.

A problem which arises with such known roll-over vent valves, especially those with a relatively large vent outlet aperture, is to ensure positive opening of the valve, either when the fuel level drops or when the vehicle and its fuel tank return to their normal position. Thus, the larger the vent outlet the greater the differential pressure acting on the valve and, in consequence, the greater the closing force effective on the valve.

Another problem which may occur with prior art valves is that pressure drop within the fuel tank may result in damaging of the fuel tank (e.g. cracking thereof). For that purpose, it has been known to form a bleed aperture permitting airing of the fuel tank, however at a significantly slow rate. Pressure drop within the fuel tank may occur, for expel as a result of increased fuel consumption (e.g. during acceleration of the vehicle) and during drop of temperature and pressure changes (e.g. change of altitude).

It has now become a demand by many manufacturers to provide fuel tanks fitted with valve means suited for rapid airing of the fuel tank upon pressure decrease in the fuel tank, at substantially high flow rates, so as to minimize the risk of damaging a fuel tank with consequential environmental issues.

It is an object of the present invention to provide an improved roll over vent valve, of the type fitted with a pressure retention device, wherein the above issues are addressed.

SUMMARY OF THE INVENTION

The invention calls for a fuel valve for fitting in a vehicle's fuel tank, wherein an outlet port of the valve is typically coupled to a fuel treating device, e.g. a fuel canister. The valve according to the present invention is designed so as to allow for airing of the fuel tank upon under-pressure (vacuum) in the fuel tank, to thereby prevent damage thereof (bucking, cracking opening of wealds, etc.) which may cause fuel leaks, resulting in severe safety and environmental consequences.

Under-pressure within the fuel tank may occur for example due to increased fuel consumption by the vehicle's engine (e.g. upon accelerating or going uphill), upon temperature changes where the fuel tank may shrink at cold temperatures, or upon pressure changes at different altitudes, etc.

According to the present invention there is provided a roll-over vent valve comprising a housing formed with a fluid inlet and a fluid outlet, a valve seating bounding an outlet aperture of the housing, a float member received within the housing and axially displaceable between a sealed position wherein a sealing member thereof sealingly bears against the valve seating of the outlet aperture to seal the fluid outlet, and an open position wherein the sealing member is disengaged from the valve seating whereby the fluid outlet is in flow communication with the fluid inlet; a pressure-retention device extending intermediate the valve seating and the fluid outlet, to thereby shut fluid flow therebetween as long as pressure differential between the fluid inlet and the fluid outlet does not exceed a minimal pressure threshold; the valve characterized in that it further comprises a one-way fluid inlet valve being in flow communication with said fluid outlet to allow fluid flow towards said fluid inlet a substantially high flow rate at the event of under-pressure at the fluid inlet.

According to an embodiment of the invention, the one-way inlet valve is in the form of a cage formed within an inlet port being in flow communication with the fluid outlet and an outlet port being in flow communication with the fluid inlet, and a sealing member received within the cage and being displaceable between sealing engagement of the inlet port and disengagement therefrom at under-pressure conditions at the fluid inlet.

By one particular design, the sealing member of the one-way inlet valve is a flexible seal whereby at the event of under-pressure at the fluid inlet the flexible seal disengages from the inlet port and deforms so as to increase the flow section area through the inlet port.

The design of the valve, according to a particular design is such that the inlet port of the one-way inlet valve is in flow communication with the fluid outlet of the valve through venting ducts overriding the pressure-retention device. The pressure-retaining device may be a disc-type pressure retainer (spring biased, or not), a ball-type pressure retainer, or any other suitable pressure retaining device.

The inlet port of the cage is formed at a wall portion of the housing and the outlet port of the cage is formed at a cage closure fixed to the housing, wherein said outlet port is in flow communication with the fluid inlet of the valve.

According to a particular embodiment of the present invention, the one-way inlet valve extends offset with respect to a longitudinal axis of the valve.

The one-way inlet valve is sealable regardless the position of the float member within the housing. Accordingly, the one-way valve may open to vent the fuel tank regardless if the float member is in its uppermost sealing position, i.e. whereby the sealing member sealingly bears against the valve seating of the outlet, or when the float member descends to its open position wherein the sealing member is disengaged from the valve seating.

The one-way inlet valve is designed for airing the valve at substantially high flow rate, of up to about 4 l/min.

The arrangement is such that the one-way inlet valve spontaneously seals at the event of rollover of the vehicle.

BRIEF DESCRIPTION OF THE DRAWINGS

In order to understand the invention and to see how it may be carried out in practice, an embodiment will now be described, by way of a non-limiting example only, with reference to the accompanying drawings, in which.

DETAILED DESCRIPTION OF EXEMPLARY EMBODIMENTS

Figure 1:
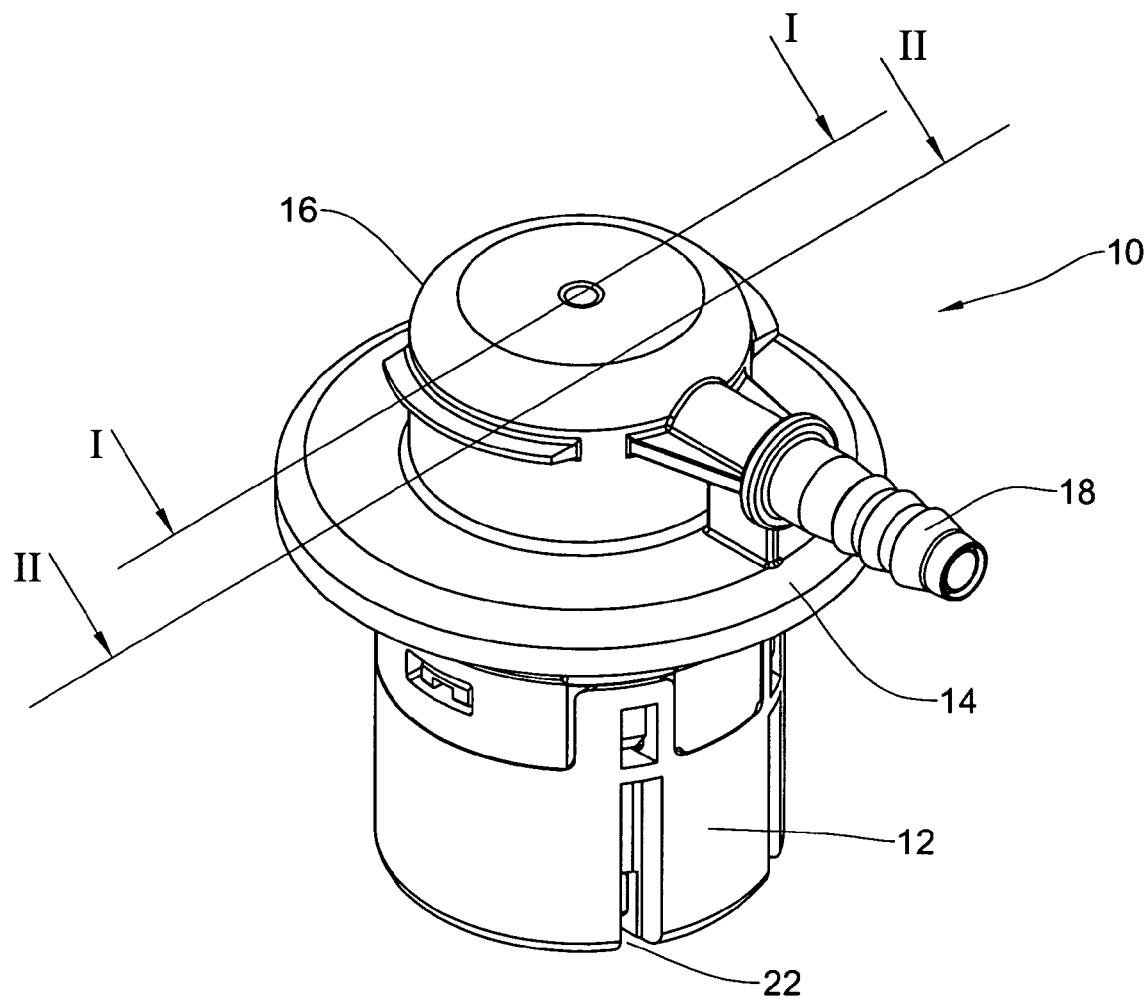
FIG. 1 is an isometric view of a valve according to the present invention.

Turning first to FIG. 1 there is illustrated a perspective view of the valve in accordance with the present invention generally designated 10, the valve comprising a cylindrical housing 12 formed with a flanged upper portion 14 adapted for welding (heat welding) within an aperture formed at an upper wall of a fuel tank (not shown) with only a top head portion 16 projecting therefrom, with a fuel outlet nozzle 18 extending therefrom and connectable to a fuel vapor treating device, e.g. canister (not shown).

The housing 12 is formed with several fluid inlet apertures 22 at a bottom portion thereof.

Figure 2A:
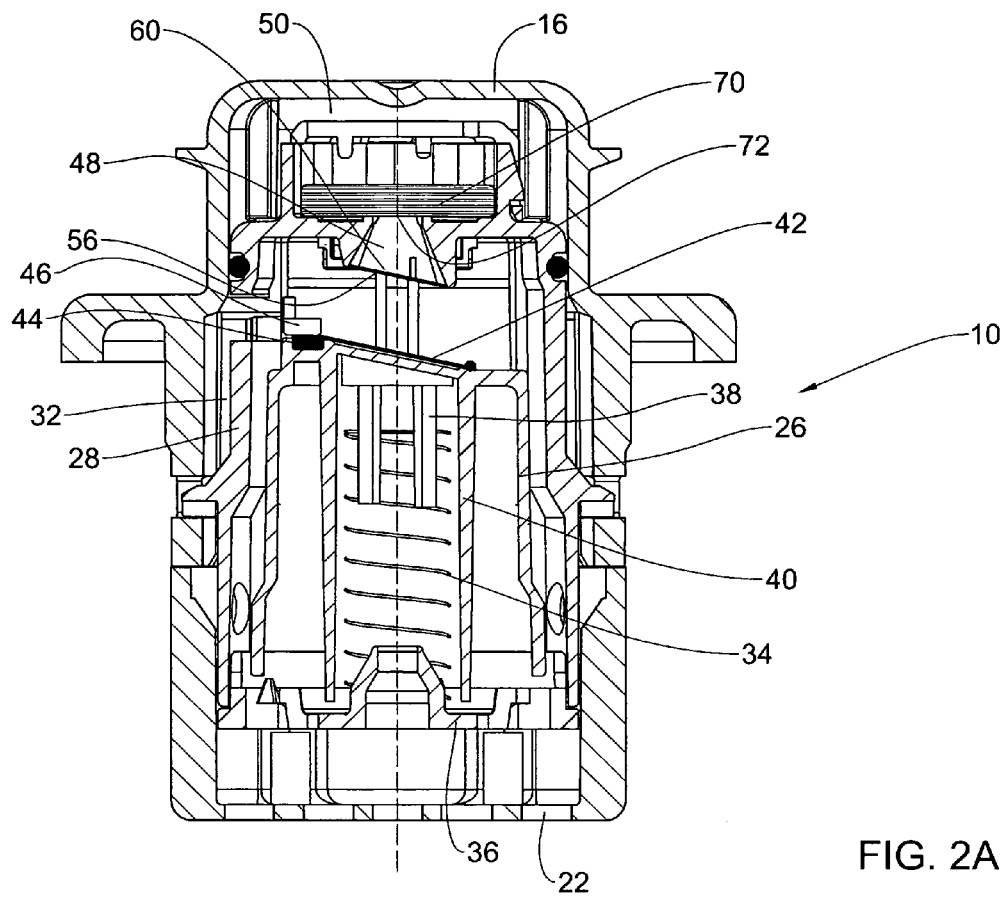
FIG. 2A is a longitudinal section along line I-I in FIG. 1, the valve being at a high out-flow position.

Referring now to FIG. 2A, quite fully displaceable within the housing 12 there is a float member 26 which owing to longitudinal ribs 28 formed on the outer surface of float member 26, and corresponding recesses 32 formed on the inside surface of the housing 12, the float member 26 is restricted to only axially displacement within the housing, without the ability to angularly (rotationally) displace therewithin.

A coiled spring 34 is provided, said spring bearing at a lower end thereof against a tubular spring support 36 of the housing and at an upper end thereof against a spring seat 38 within a float retention cylinder 40, thereby biasing the float member 26 in an upper direction.

An elongated, strip-like, flexible membrane 42 is anchored at one end thereof 44 by means of an anchoring stud 46 to an upper wall of the float member 26, which is offset with respect to the longitudinal access of the housing 12 and with respect to an outlet 48 being in flow communication with a space 50 at the top portion 16 of the float and thus with the outlet nozzle 18 (FIG. 1). Outlet 48 has a downwardly depending valve seating 56, formed at its lower-most end with an inclined, elongated outlet aperture 60 sealingly engageable by the strip-like, flexible membrane sealing member 42.

Figure 3A:
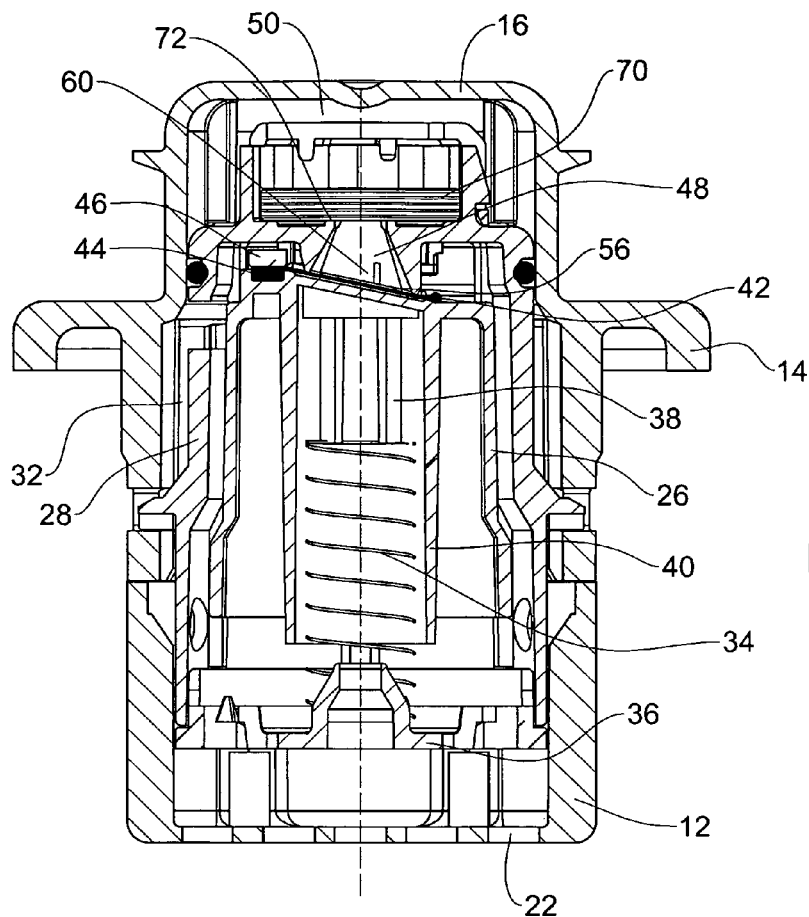
FIG. 3A is a longitudinal section along line I-I in FIG. 1, the valve being at a high in-flow position.

Float member 12 is biased upwardly into sealing engagement of the fluid outlet by means of the compression spring 34 which acts together with inherent buoyancy of the float member 26. These upwardly-directed forces (buoyancy and spring biasing) tend to seal the slit-like outlet aperture 56 by said sealing strip-like sealing member 42 as seen in the position of FIG. 3A.

As can further be seen, the outlet chamber 50 comprises, above the fluid outlet 48, a pressure retention disk 70 which normally bears against a rimmed seating 72 of the downwardly depending fluid outlet funnel 48. The arrangement is such that the pressure retention disk 70 is displaceable between a closed position (FIGS. 3A and 3B) wherein it sealingly bears against the rim 72 to allow for a predetermined pressure buildup within the fuel tank (typically about 3 to 4 KPA, not shown) so as to shut off the sealing process upon sensing such pressure buildup within the fuel tank, as known per se. However, when the pressure within the fuel tank exceeds the predetermined pressure, the pressure retention disk 70 will disengage from the sealing rim 72 (see FIG. 2B) to allow pressure discharge from the fuel tank, through the outlet nozzle 18 (FIG. 1) and into the fuel treating canister (not shown). It should be appreciated by a person versed in the art that the pressure-retaining device may be a disc-type pressure retainer (spring biased, or not), a ball-type pressure retainer, or any other suitable pressure retaining device.

Formed offset the funnel shaped fluid outlet 48 there is a one-way inlet valve (FIGS. 2B and 3B) comprising a cage structure 80 constituting of an upper wall portion 82 being part of the inside housing of the valve, and a bottom support member 84 fixedly attached thereto, e.g. by heat welding, sonic welding, etc., forming a space 86 within the cage 80. The cage 80 is formed with an inlet port 90 being in flow communication with the upper space 50 of the valve, by means of venting ducts 94 overriding the pressure-retention disk 70 whereby the inlet port 90 is in flow communication with the fluid outlet nozzle 18 (FIG. 1) of the valve. An outlet port 98 is formed in the closure member 84 of the cage 80, said outlet port 98 being in flow communication with the fluid inlet apertures 22 of the valve.

Figure 2B:
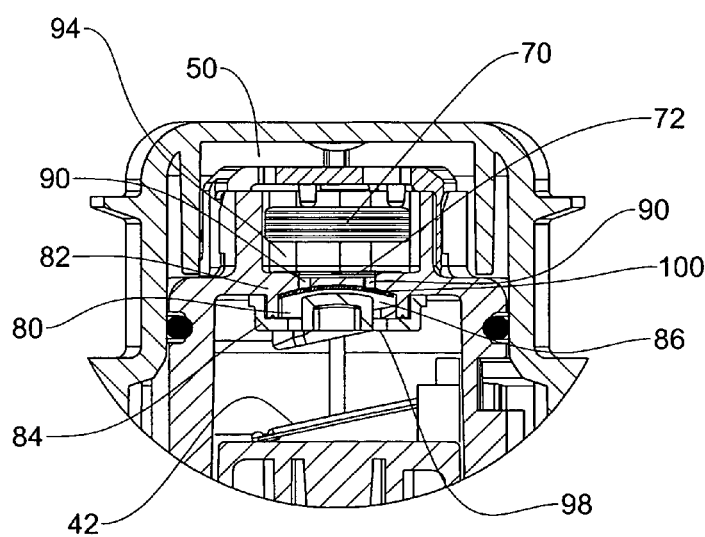
FIG. 2B is an enlargement of a top the portion of the valve, sectioned along line II-II in FIG. 1, the valve being at a high out-flow position.
Figure 3B:
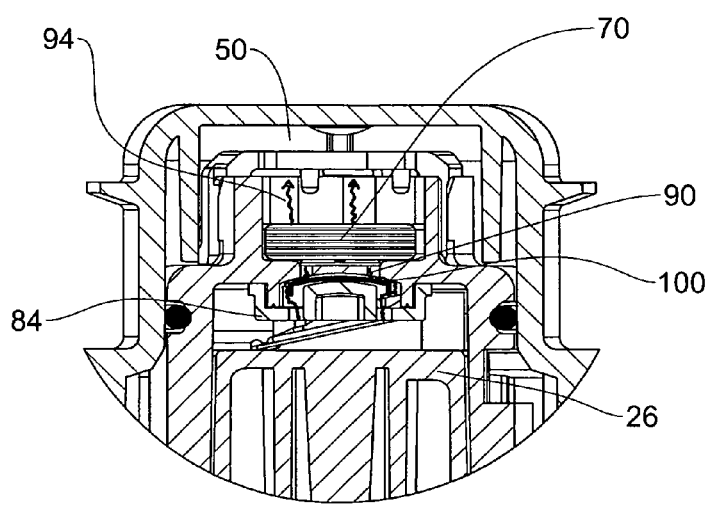
FIG. 3B is an enlargement of a top the portion of the valve, sectioned along line II-II in FIG. 1, the valve being at a high in-flow position.
Figure 4:
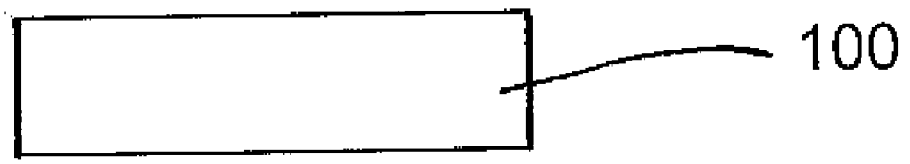
FIG. 4 is a top planer view of the rectangular sealing member according to the present invention.

Retained within the cage 80 there is a sealing member 100 in the form of a resilient seal (rectangle according to the present example and being sufficiently thin to maintain flexibility) displaceable within the cage 80 between sealing engagement of the inlet port 90 (FIG. 2B, and disengagement thereof, as seen in the position of FIG. 3B). Furthermore, owing to its resiliency, the sealing member 100 will not only displace from sealing engagement of the inlet port 90, it will also deform so as to increase the effective section area of the inlet port 90, to increase the flow rate into the valve and consequently into the fuel tank (not shown), at a flow rate of at of up to about 4 liters per minute.

The cage 80 is defined by a top concave abutment surface defined by an inner surface of upper wall portion 82, and a bottom convex abutment surface defined by an inner surface of closure member 84. The sealing member 100 is located in a gap between the top concave abutment surface and bottom convex abutment surface to accommodate the sealing member 100 in a curved configuration having convex and concave surfaces, as shown in FIGS. 2B and 3B.

In the normal condition of the valve, when it is mounted within the fuel tank, and the latter, together with the associated vehicle is in an upright position, the valve is as shown in the position of FIG. 2A of the drawings, namely the float member 26 is disengaged from the fluid outlet 48 whereby maximum gravity forces are effected on the float member 26. In consequence, the weight of the float member 26, together with the absence of upwardly-directed buoyancy forces, overcome the upwardly-directed biasing effect of the compression spring 34 and float member 26 is thus located in the position of FIG. 2A of the drawings with the fluid outlet 48 being completely open thereby allowing for venting of fuel vapors and the like. However, in the position of FIG. 2A, and as explained in the above, the pressure-retention disk 70 is in its closed position, namely bearing against sealing rim 72, so as to allow for pressure built within the fuel tank (to about 3 to 4 KPA) so as to shut off a fuel pump (not shown) and prevent refueling, as known in the art.

When, however, either as a result of over-filling of the fuel tank and consequent entry of fuel into the valve, thereby increasing the upwardly-directed buoyancy forces acting on the float member 26, or as a consequence of partial or complete rollover of the vehicle and the fuel tank, resulting both in the entry into the housing of fuel and the reduction of the downwardly-directed gravity forces, the upwardly-directed biasing effect of the compression spring 34, together possibly with the increased buoyancy, result in the upwardly-directed displacement of the float member 26 into its closed position as shown in FIG. 3A. In this way, it is ensured that upon rollover or excessive fuel flow into the valve housing 12, the valve 10 is closed against the escape of fuel.

When the fuel tank returns to its normal position or upon fluid level decreasing within the fuel tank, the steadily increasing effect of gravity on the float member 26 overcomes the steadily decreasing upwardly-directed buoyancy forces and the biasing effect of the coiled spring 34 whereby the float member 26 tends to move downwardly with the progressively detachment of the sealing member 42.

With particular reference being made now to FIGS. 2B and 3B, it is illustrated how the one-way inlet valve cooperates with the roll-over vent valve of the present invention. In the normal condition of the valve, when pressure within the fuel tank is maintained within predetermined pressure values (namely as long as the fuel tank is not at under pressure (vacuum); as already discussed hereinabove, over pressure of up to about 3 to 4 KPA is desired so as to prevent refueling) the sealing diaphragm 100 is in its sealed position of FIG. 2B, namely sealing the inlet port 90 to prevent fluid flow therethrough, in either direction, such that the roll-over vent functions as discussed hereinabove in conjunction with the pressure-retention disk. The elasticity of the sealing member 100 together with the structure of the support member of cage 80 tend to retain the sealing member 100 sealingly engaged with the inlet port 90 of the one-way valve (FIG. 2B).

However, at the event of pressure drop within the fuel tank, and developing of under-pressure (pressure decrease within the fuel tank may occur, for example, due to increased fuel consumption by the vehicle's engine (e.g. upon accelerating or going uphill) or upon temperature changes where the fuel tank may shrink at cold temperatures, or upon pressure changes at different altitudes) the sealing strip 100 detaches from the inlet port 90 (FIG. 3B) and it also deforms so as to increase the throughflow section area of the inlet port 90, to thus allow venting of the fuel tank at a substantially high flow rate, e.g. up to about 4 liters per minute. When, however, pressure within the fuel tank returns to normal, or upon over pressure, the one-way inlet valve will spontaneously displace into its closed position (FIG. 2B) whereby fluid discharge is taken care of by means of the main fluid outlet 48 of the valve 10.

Whilst an embodiment has been shown and described, it is to be understood that it is not intended thereby to limit the disclosure of the invention, but rather it is intended to cover all modifications and arrangements falling within the spirit and the scope of the invention, mutatis mutandis.

The invention claimed is:

1. A roll-over vent valve, comprising:
a housing formed with a fluid inlet and a fluid outlet, a valve seating bounding an outlet aperture of the housing, a float member comprising a sealing member, the float member received within the housing and axially displaceable between a sealed position wherein the sealing member sealingly bears against the valve seating of the outlet aperture to seal the fluid outlet, and an open position wherein the sealing member is disengaged from the valve seating whereby the fluid outlet is in flow communication with the fluid inlet;
a pressure-retention device extending intermediate the valve seating and the fluid outlet, to thereby shut fluid flow therebetween as long as pressure differential between the fluid inlet and the fluid outlet does not exceed a minimal pressure threshold; and
a one-way fluid inlet valve being in flow communication with said fluid outlet to allow fluid flow towards the fluid inlet at a substantially high flow rate in the event of under-pressure at the fluid inlet, the one-way fluid inlet valve comprising a cage having an inlet port provided through a wall portion of the housing and being in flow communication with the fluid outlet of the roll-over vent valve, and an outlet port provided through a cage closure fixed to the housing and being in flow communication with the fluid inlet of the roll-over vent valve,
wherein the cage closure and the wall portion define therebetween a gap in which a sealing member is freely retained thereby being displaceable and deformable within the gap between sealing engagement of the inlet port and disengagement therefrom.

2. A roll-over vent valve according to claim 1, wherein disengagement of the sealing member from the inlet port of the one-way inlet valve takes place whenever pressure at the fluid inlet of the valve decreases below pressure at the fluid outlet of the valve.

3. A roll-over vent valve according to claim 1, wherein the sealing member of the one-way inlet valve is a flexible seal whereby in the event of under-pressure at the fluid inlet the flexible seal disengages from the inlet port and further deforms so as to increase flow section area through the inlet port.

4. A roll-over vent valve according to claim 1, wherein the inlet port of the one-way inlet valve is in flow communication with the fluid outlet of the valve through venting ducts overriding the pressure-retention device.

5. A roll-over vent valve according to claim 1, wherein the outlet port of the one-way inlet valve is in flow communication with the fluid inlet of the valve.

6. A roll-over vent valve according to claim 1, wherein the one-way inlet valve extends offset with respect to a longitudinal axis of the valve.

7. A roll-over vent valve according to claim 1, wherein the one-way inlet valve is designed for venting the valve at a substantially high flow rate, of up to about 4 l/min.

8. A roll-over vent valve according to claim 1, wherein the one-way inlet valve spontaneously seals in the event of roll-over of a vehicle.

9. A roll-over vent valve according to claim 1, wherein the sealing member is a rectangle sealing member.

10. A roll-over valve according to claim 9, wherein the sealing member is in the form of a rectangular flexible seal and being sufficiently thin to maintain flexibility.

11. A roll-over vent valve according to claim 1, wherein the one-way fluid inlet valve is sealable regardless of the position of the float member within the housing.

12. A roll-over vent valve according to claim 1, wherein the wall portion is formed with a top abutment surface and the cage closure is formed with a bottom abutment surface, defining therebetween the gap.

13. A roll-over vent valve according to claim 12, wherein the top abutment surface is concave.

14. A roll-over vent valve according to claim 13, wherein when the sealing member abuts the concave surface, its elasticity facilitates sealing engagement of the inlet port of the check-valve.

15. A roll-over vent valve according to claim 12, wherein the bottom abutment surface is convex.

* * * * *